United States Patent Office 2,718,532
Patented Sept. 20, 1955

2,718,532

REACTION OF ACETYLENE WITH ALKYL SUBSTITUTED BENZENES

Edwin Marvin Smolin, Stamford, Conn., assignor to American Cyanamid Company, New York, N. Y., a corporation of Maine No Drawing. Application July 23, 1954,
Serial No. 445,459

5 Claims. (Cl. 260—668)

This invention relates to a process of producing diaryl paraffins and, more particularly, to a process of producing 1,1-diarylethanes by the reaction of acetylene with a mono- or di-alkyl substituted benzene.

Paraffins having at least two carbon atoms and having two aryl substituents attached to one of said carbon atoms have been produced in the past by a number of different reactions. Thus, for example, a mono- or di-alkyl substituted benzene has been reacted with paraldehyde in the presence of hydrogen fluoride to form a 1,1-diarylethane. It has also been proposed to react acetylene with a mono- or di-alkyl substituted benzene in the presence of a sulfuric acid-mercuric sulfate catalyst for the production of 1,1-diarylethanes. I have now found a novel catalyst which is effective for the reaction of acetylene with a mono- or di-alkyl substituted benzene for the production of 1,1-diarylethanes.

The diarylethanes produced in accordance with my invention are useful as insecticides or as starting materials in the production of insecticides and as starting materials in the production of wetting agents. The diarylethanes produced are especially important in that they may be cracked to produce ring- or nuclear-substituted styrenes which may be polymerized to form synthetic resinous compositions useful in the production of films, castings and molded objects.

It is therefore an object of my invention to provide a new method for the production of paraffins having at least two carbon atoms and having two aryl substituents attached to one of said carbon atoms. It is a further object of my invention to prepare 1,1-diarylethanes by the reaction of acetylene with a mono- or di-alkyl substituted benzene in the presence of a novel catalyst therefor. These and other objects of my invention will be discussed more fully hereinbelow.

I have now found that the reaction of acetylene with a mono- or di-alkyl substituted benzene for the production of 1,1-diarylethane may be carried out in the presence of a sulfuric acid-copper sulfate catalyst. The copper sulfate may be dispersed in the sulfuric acid and then introduced into the reaction zone for the production of the diaryl substituted paraffins or alternatively the copper sulfate may be separately introduced into the reaction mixture containing sulfuric acid. Other methods of introduction of the catalyst into the reaction mixture will be apparent to those skilled in the art. Sulfuric acid of concentrations of from about 85% to about 105%, preferably from about 88% to about 98.5% may be employed in the instant process. The amount of sulfuric acid that is used in the reaction may vary over rather wide limits, for example, from about one part of sulfuric acid per part of substituted benzene charged to about one part of sulfuric acid to about 25 parts of substituted benzene charged. However, it is preferred that from about 1:12 to about 1:5 parts of concentrated sulfuric acid be employed per part of substituted benzene. The amount of the copper sulfate employed to form the sulfuric acid-copper sulfate catalyst may range from about 0.5% to about 20% by weight, based on the weight of sulfuric acid present. It is preferred that about 5% by weight of copper sulfate be present, based on the total weight of sulfuric acid present.

The following example is given by way of illustration and not limitation in order that those skilled in the art may more fully understand the present inventive concept. All parts are parts by weight and should not be considered limitations unless so expressed in the appended claims.

*Example*

To a vigorously stirred mixture of 428 parts of toluene and 42.5 parts of 95.5% sulfuric acid, maintained at 10° C. to 12° C., were added 1.5 parts of copper sulfate. Gaseous acetylene was bubbled in for 40 minutes at the rate of 0.015 mol per minute. The liquid phases present were then separated and the organic layer was washed with aqueous sodium hydroxide solution and distilled. 1,1-ditolylethane representing a yield of 46%, based on the toluene used up, was obtained.

The stoichiometry of the present reaction requires that two mols of the mono- or di-alkyl substituted benzene react with each mol of acetylene for the formation of the diaryl substituted paraffin. In order to obtain optimum yields of the diaryl substituted paraffin, it is preferred that from about 15% to about 45% of the stoichiometric amount of acetylene theoretically required to react with all of the substituted benzene be employed herein. By thus limiting the amount of acetylene that is introduced into the reaction mixture, deleterious side reactions are minimized.

Examples of mono- and di-alkyl substituted benzenes that may be utilized in the process of my invention are such as toluene, o-, m- and p-xylenes, ethylbenzene and the like. Long-chain mono- and di-alkyl substituted benzenes may also be employed in the process of my invention when such materials are available.

A convenient method of carrying out the present reaction of my invention is to charge the desired amount of substituted benzene into a suitable reaction vessel which is then cooled to about 5° C. below the desired reaction temperature. Stirring of the substituted benzene is then begun and the sulfuric acid catalyst then introduced therein. As previously stated, the sulfuric acid may contain the metallic salt or the metallic salt may be separately introduced into the mixture. The reaction may be carried out at temperatures ranging from about −20° C. to about 70° C. Stirring of the mixture is maintained throughout the reaction to emulsify the acid and the hydrocarbons and to prevent catalyst deposition at the bottom of the reactor. The desired calculated amount of acetylene is then introduced into the reactor at the desired rate. After the acetylene addition is complete, stirring of the reaction mixture is discontinued, the reaction mixture is separated into two layers, the organic layer washed with an aqueous caustic solution and the 1,1-diarylethane recovered therefrom by distillation. When the reaction is carried out at below 0° C., the reaction mixture is more difficult to work up and the separation of the acid layer from the desired product is slower. Therefore, it is preferred that a temperature range of from about 0° C. to about 45° C. be employed in the process.

The process of my invention may be carried out as a batch, semicontinuous or as a single or multistage continuous operation. Inasmuch as a semicontinuous or batch operation inherently entails an increased number of manual procedural steps and a single stage continuous reaction produces lower yields, it is desirable to carry out the reaction in a multistage continuous reactor.

I claim:

1. In the preparation of a paraffin having at least two carbon atoms and having two aryl substitutents attached to one of said carbon atoms wherein acetylene is reacted with a member selected from the group consisting of mono- and di-alkyl substituted benzene, the improvement which comprises carrying out the reaction in the presence of a sulfuric acid-copper sulfate catalyst.

2. In the preparation of 1,1-diarylethane wherein acetylene is reacted with a member selected from the group consisting of mono- and di-alkyl substituted benzene, the improvement which comprises carrying out the reaction in the presence of a sulfuric acid-copper sulfate catalyst.

3. In the preparation of 1,1-ditoylethane wherein acetylene is reacted with toluene, the improvement which comprises carrying out the reaction in the presence of a sulfuric acid-copper sulfate catalyst.

4. In the preparation of 1,1-dixylylethane wherein acetylene is reacted with xylene, the improvement which comprises carrying out the reaction in the presence of a sulfuric acid-copper sulfate catalyst.

5. In the preparation of 1,1-bis(ethylphenyl)ethane wherein acetylene is reacted with ethylbenzene, the improvement which comprises carrying out the reaction in the presence of a sulfuric acid-copper sulfate catalyst.

References Cited in the file of this patent

Reilly et al., Jour. Am. Chem. Soc., vol. 50 (1928), pages 2564–2566.